Jan. 15, 1963  J. W. YATES ETAL  3,073,407
AUTOMATIC PARKING DEVICE
Filed May 6, 1957  5 Sheets-Sheet 1
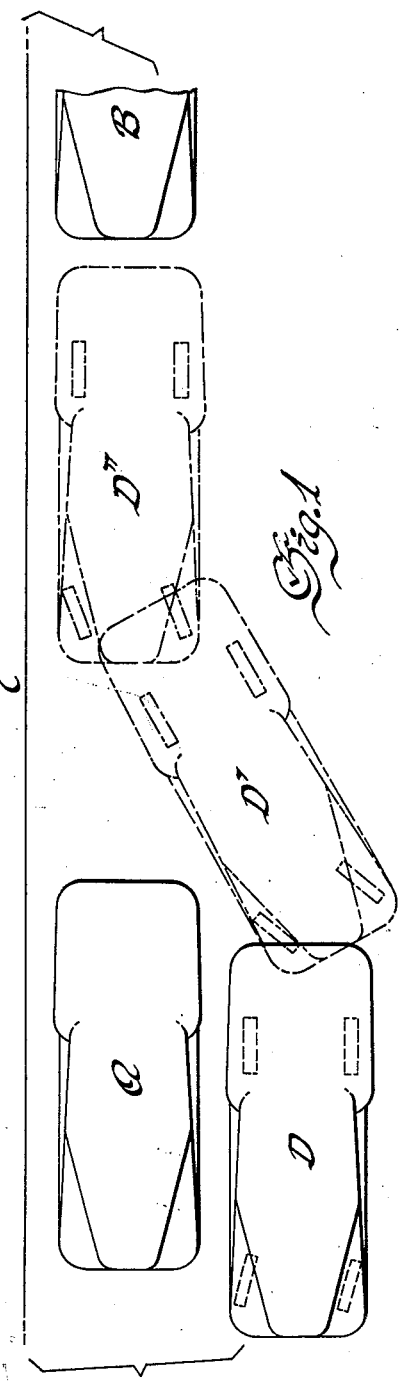
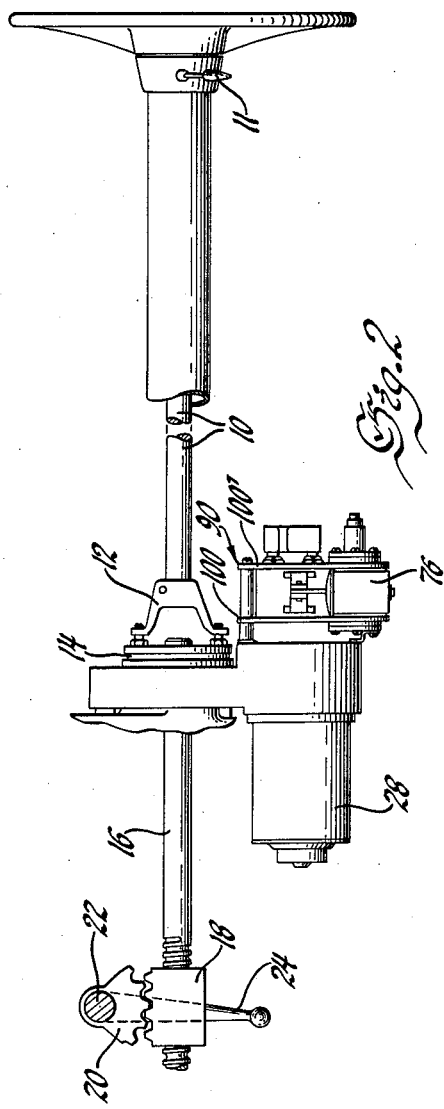
INVENTORS
John W. Yates &
John C. Clements
BY
S. C. Thope
ATTORNEY Jan. 15, 1963 J. W. YATES ETAL 3,073,407
AUTOMATIC PARKING DEVICE
Filed May 6, 1957 5 Sheets-Sheet 3

INVENTORS
John W. Yates &
John C. Clements
BY
J. C. Thorpe
ATTORNEY

INVENTORS
John W. Yates &
John O. Clements
BY
ATTORNEY

Jan. 15, 1963  J. W. YATES ETAL  3,073,407
AUTOMATIC PARKING DEVICE
Filed May 6, 1957  5 Sheets-Sheet 5

INVENTORS
John W. Yates &
John C. Clements
BY J.C. Thorpe
ATTORNEY

United States Patent Office 3,073,407
Patented Jan. 15, 1963

3,073,407
AUTOMATIC PARKING DEVICE
John W. Yates, Raytown, Mo., and John A. Clements, Brownsburg, Ind., assignors to General Motors Corporation, Detroit, Mich., a corporation of Delaware
Filed May 6, 1957, Ser. No. 657,287
7 Claims. (Cl. 180—1)

This invention relates to a system of apparatus for application to an automotive vehicle to accomplish automatically a "pre-set" maneuver, by which is meant a maneuver that must conform to a certain pattern determined by fixed conditions, e.g., a curve or curves in a driveway traversed daily incident to backing from a garage into a street, or a parking maneuver, as where it is desired to position the vehicle parallel to a curb between two previously parked cars, etc.

The invention is considered particularly valuable as applied in connection with the last-mentioned operation, which even with the advent of power steering is accomplished by many individuals only with annoying difficulty, and with the expenditure of considerable time in many cases. The annoyance is not limited to the driver since the operation often delays traffic on busy city streets, and if prolonged increases the likelihood of mishaps of varying seriousness.

According to the invention, the parking of the vehicle or other maneuver is achieved with substantially no effort on the part of the driver and in a minimum of time.

Generally described, the apparatus herein comprises a mechanism, as a cam or equivalent instrumentality, which is operated in accordance with the amount of rotation of the road wheels and which controls electrical means connected to the steering mechanism to power the same as required to achieve the maneuver. In effect, the apparatus takes over the steering function from the driver during the maneuver, although the system may be so designed that the driver can at any time overpower the apparatus if he desires. With the vehicle initially properly placed for the maneuver, the driver during the maneuver need operate only the accelerator and brake pedal; in fact, if the car is equipped with an automatic transmission set to allow some "creep," the drive may be required only to manipulate the brake.

The electrical means operating to power the steering mechanism is most suitably a reversible electric motor. In any case, such means has in circuit therewith a limiting device serving to prevent the dirigible wheels of the vehicle from being held against their full-over stops with the electrical power means energized. In this way, the electrical power means is kept from stalling and the wheel suspension components are not subjected to the high stresses which they would otherwise encounter. An incidental but nevertheless major advantage of the limiting device resides in the fact that it can be easily made adjustable to the end of modifying the automatic steering pattern should that be necessary or desirable.

The invention will be particularly described in terms of a preferred embodiment thereof illustrated by the accompanying drawings wherein:

FIG. 1 shows the parking operation with reference to which the particular system was designed;

FIG. 2 shows the apparatus as installed;

Figure 3:
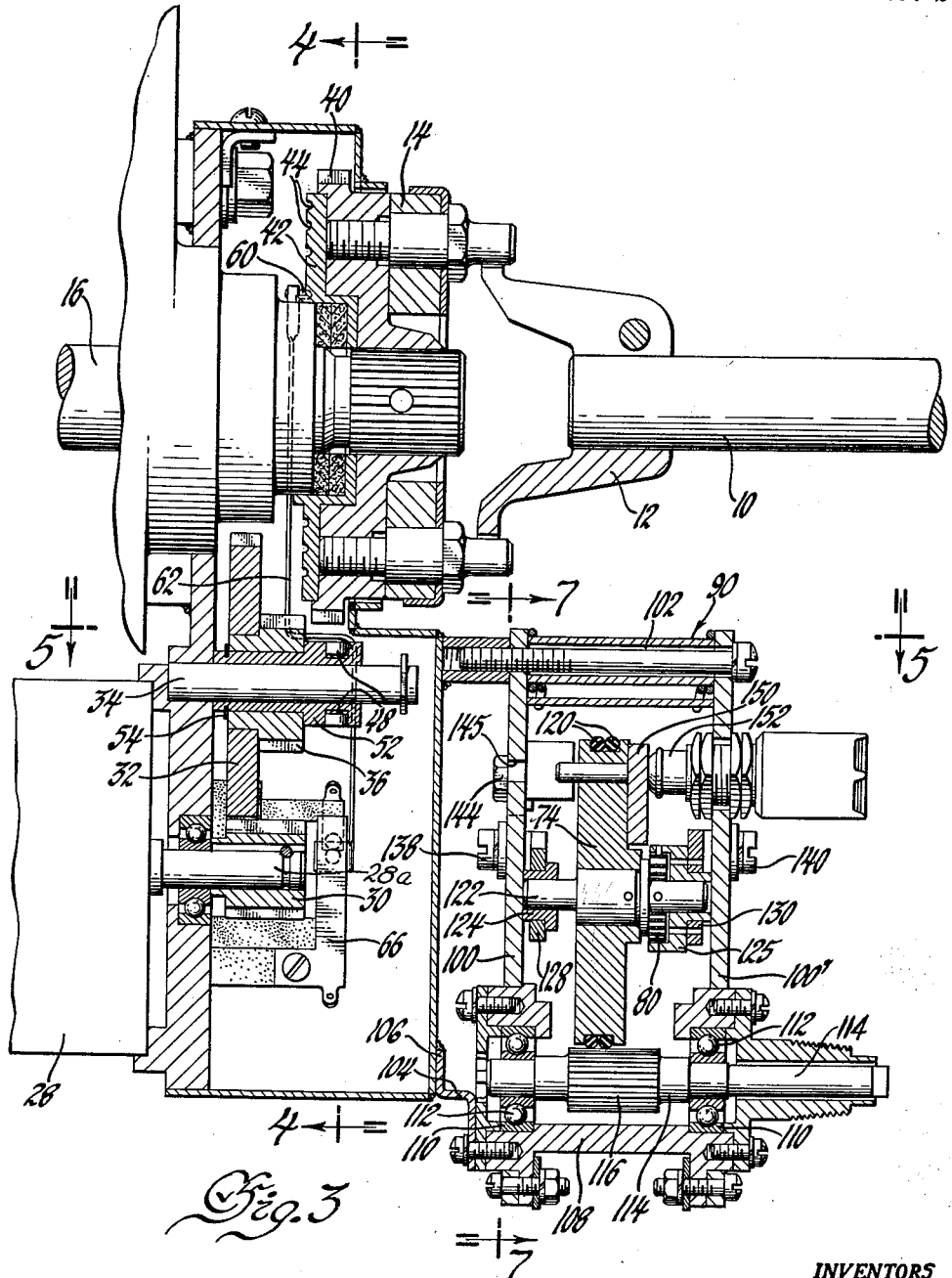
FIG. 3 is a view, partly in section and partly in elevation, showing the principal parts.

Referring first to FIG. 2, the numeral 10 indicates a steering shaft terminating in the upper component of a flexible coupling 12. The lower component 14 of such coupling, which avoids alignment problems in assembly and which operates to mitigate road shocks, has a pin and spline connection (FIG. 3) with a worm shaft 16 carrying a ball nut 18. The rack teeth of the nut 18 mesh with a gear sector 20 integral with cross-shaft 22 through which the pitman arm 24 is actuated. The flexible coupling, although not essential to the invention, is desirable for the purposes indicated. As exemplary of a suitable coupling may be mentioned the coupling described and claimed in Burton Patent 2,753,848.

Going now to FIGURE 3, it will be seen that the automatic parking device includes a reversible electric motor 28, the output shaft 28a of which mounts a driving pinion 30. This pinion meshes with a gear 32 slidable on a shaft 34 which also carries a gear 36. The latter gear is adapted to mesh with a gear 40 forming part of the lower component 14 of the previously mentioned flexible coupling. This coupling component also carries an annular plate 42 having a "phonograph record" groove 44 cut therein for a purpose which will later appear.

Figure 5:
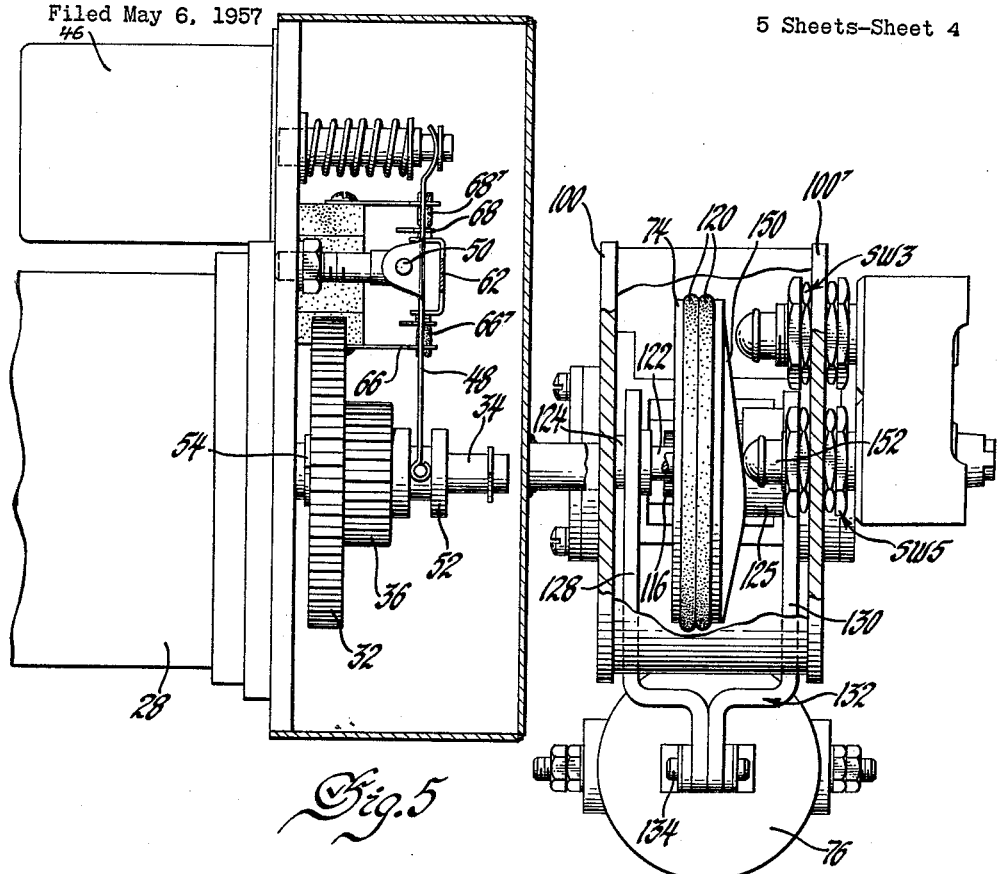
FIG. 5 is taken on the line 5—5 of FIG. 3.

A solenoid 46 (FIGS. 5 and 6) forms part of the assembly and has connected to its armature in lost-motion fashion an actuator link 48 pivoted at 50 to a support member and bifurcated at its end opposite the solenoid to suitably engage an adaptor 52. Considering the snap ring 54 (FIG. 3) and the shouldering engagement of the gear 36 with the wall of the enlarged portion of the adaptor 52 it should be apparent that on energization of the solenoid 46 the gear 36 is thrown into engagement with gear 40.

Figure 4:
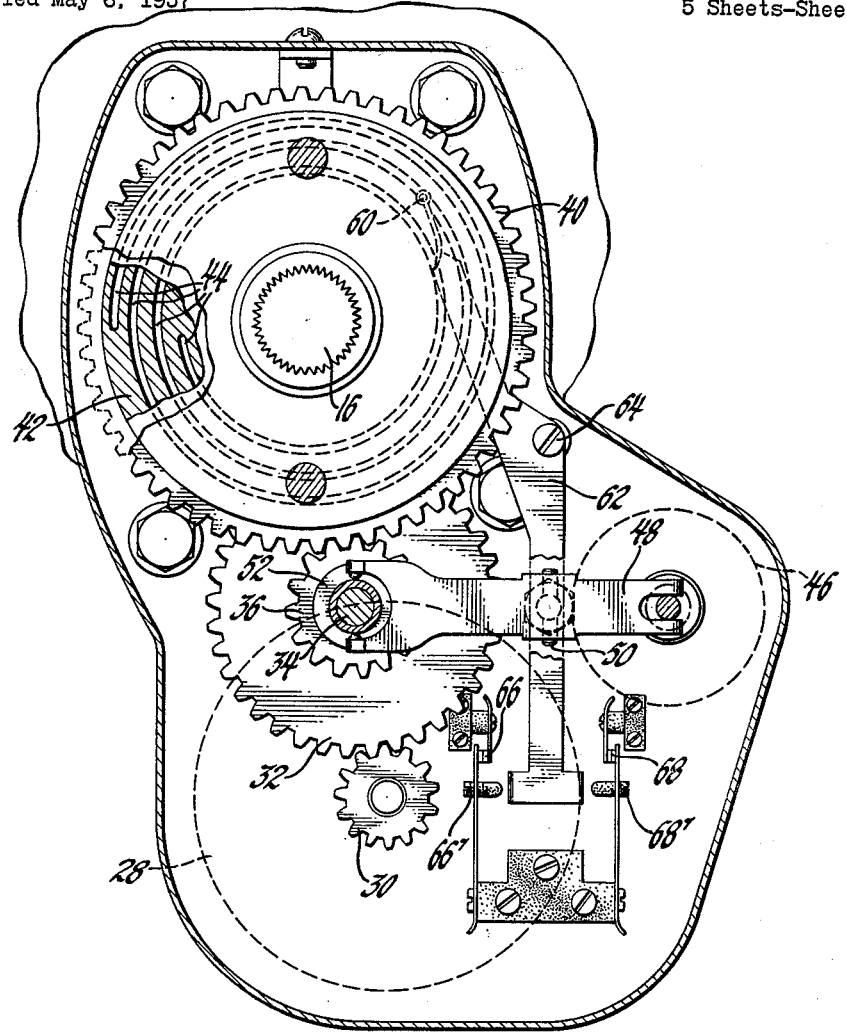
FIG. 4 is a section taken on the line 4—4 in FIG. 3.

Reverting to the "photograph record" groove in the face of the gear 40, there will be seen riding in such groove (FIGS. 3 and 4) a stylus 60 carried by an arm 62 pivoted to a fixed member at 64 and enlarged at its lower end so as to suitably actuate switches 66 and 68, hereinafter referred to as "limiting switches" and serving a purpose subsequently to be described.

Figure 6:
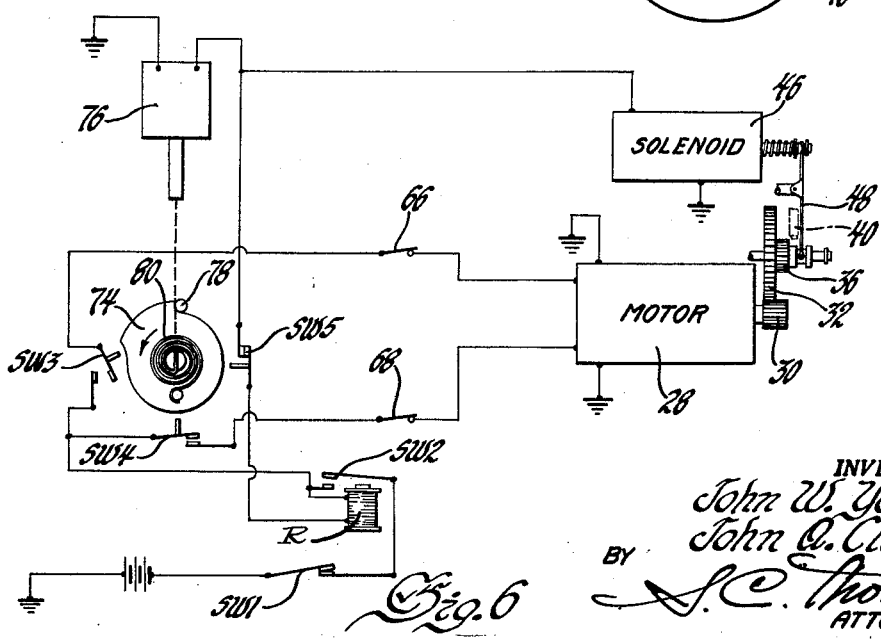
FIG. 6 is a schematic representation of the electric circuitry.
Figure 7:
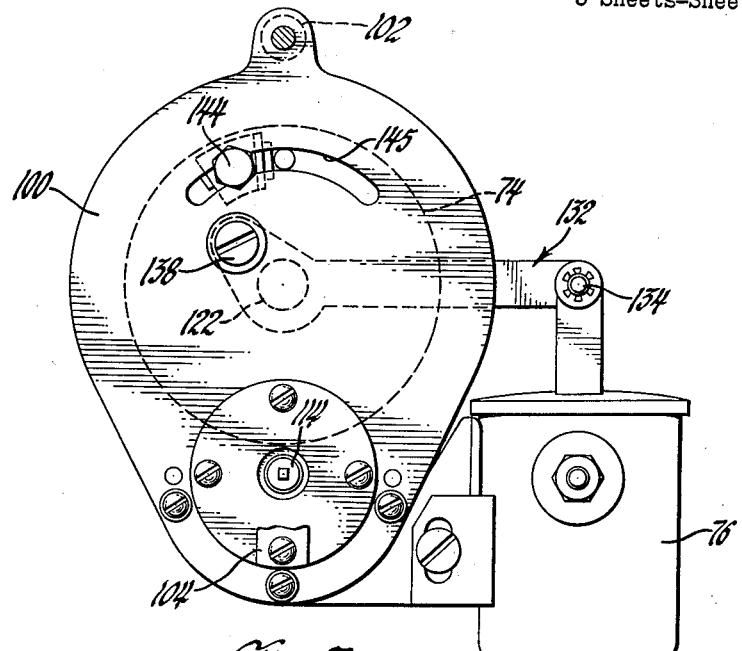
FIGS. 7 and 8 are elevations of the control component, FIG. 7 being taken on the line 7—7 in FIG. 3.

In the interest of facilitating an understanding of the invention, it is believed advisable at this point to generally describe the operation of the apparatus with reference to the wiring diagram (FIG. 6). As previously indicated, the sequence of operations illustrated by FIG. 1 is automatically brought about by a cam or equivalent instrumentality which in the wiring diagram is denoted by the numeral 74. This cam is advantageously driven by a take-off from the speedometer drive and is under the control of a solenoid 76 governing a clutch which when engaged operatively connects the cam to the take-off shaft for rotation thereby. On the de-energization of the solenoid 76, the cam is brought to its shown position against a stop 78 by a return spring 80.

Let it be assumed now that the vehicle (FIG. 1) has been brought to a position where it is located approximately 2½ feet from the side of the car A at curb C and about 1 foot forward of the rear bumper of car A. With the vehicle so positioned, the transmission control lever 11 (FIG. 2) is placed in reverse effecting closing of switch SW1. Thereafter a knob in the driver's compartment is turned (or a button pressed) to close switch SW2 which is held closed as a consequence of the energization of the coil R. With the circuitry energized, the solenoid 76 effects clutching of the cam 74 to the take-off from the speedometer drive shaft, resulting in counterclockwise rotation of the cam, as indicated by the arrow. As should be easily seen, rotation of the cam is accompanied by sequential closing of switches SW3 and SW4, which should be considered as spring biased to open position. Closing of switch SW3 applies potential to the reversible motor 28 so that the output shaft of the motor rotates in a direction causing clockwise rotation of the worm shaft 16. Gear 36, of course, is at this time in engagement with the gear 40, since the solenoid 46 became energized to shift the gear 36 rightward (FIG. 3) on the closing of switch SW2.

The rightward rotation of the wormshaft 16 naturally swings the dirigible wheels of the vehicle rightward. (position D, FIG. 1) so that as the accelerator is depressed (with the operator's hands off the steering wheel), the front end of the vehicle as the same moves rearwardly first swings outwardly as required. Now since cam 74 rotates in correspondence with the amount of rotation of the road wheels, switch SW3 becomes open and switch SW4, which is in the circuit including the second winding of the motor 28, becomes closed at the proper time to effect leftward swinging of the dirigible wheels (position D′, FIG. 1).

The dirigible wheels are maintained swung to the left through the stage represented by D′ and D″ (FIG. 1). Straightening of such wheels to center the vehicle between cars A and B is accomplished manually.

Clutch-control solenoid 76 and the solenoid 46 remain energized until switch SW5 is opened by the cam 74, with the vehicle in position D″.

On the de-energization of the solenoids, gear 36 assumes its shown position (FIG. 3) out of engagement with gear 40 and cam 74 becomes de-clutched from the speedometer drive, whereupon it is rotated to its position illustrated by the action of the return spring 80 which winds up incident to the counterclockwise rotation of the cam.

Reverting to the mechanism including the groove 44 in plate 42 and the associated stylus 60, it should be clear that the turning of the dirigible wheels of the vehicle is marked by inward or outward movement of the stylus on the face of the plate (FIG. 4), as determined by the direction of the turning. It should also be clear from the identified figure taken with FIGURE 6 that the inward or outward movement of the stylus is accompanied by rocking of the actuator link 62 on its pivot, with the result that as movement of the stylus continues the limiting switch 66 or 68 in the path of the stylus becomes open and motor 28 de-energized.

The "phonograph record" groove is carefully designed to the end that the circuit to the motor is broken just prior to the dirigible wheels reaching their bumper stops. However, substantial latitude may be provided, for example, by designing the switch members 66′ and 68′ so that they thread into their supports. So designing these members is further advantageous, as brought out in the forepart hereof, in that the turning radius of the dirigible wheels in one or both directions may be thereby changed—in many cases allowing for the accomplishment automatically of maneuvers other than the particular parking operation illustrated.

It will be understood, of course, that during normal operation of the vehicle the apparatus herein has no effect whatsoever on the steering characteristics of the vehicle. It is only when switches SW1 and SW2 are closed that the apparatus can operate. The vehicle may or may not be equipped for power steering in normal operation.

So far, the operative parts including cam 74, have been described only in an essentially functional manner. A cam control assembly, generally denoted by the numeral 90 in FIG. 3, which has been found suitable in a test installation is illustrated by FIGS. 3, 5, 7 and 8. It will be seen that such assembly comprises housing plates 100, 100′ separated by spacers 102. Plate 100 has fixed thereto a bracket member 104 having flanges 106 adapted for connection to a suitable mount. A third housing member 108 is disposed between the plates 100, 100′ and seats races 110 for the ball bearings 112. Turning within the bearing is a shaft 114, this being the take-off shaft previously mentioned, adapted to be driven by the flexible speedometer drive and having a serrated portion 116 engaging rubber rings 120 carried by the cam 74. The shaft 122 of the cam is journalled in bushings 124, 125, bushing 125 being made to larger diameter than bushing 124 so as to accommodate the return spring 80 which, of course, is connected both to the cam shaft and bushing.

Bushings 124 and 125 are carried by the arms 128 and 130 of a yoke member 132 (FIG. 5) connected at 134 with the armature of solenoid 76. The ends of the arms are pivotally supported at 138 and 140 so that on de-energization of the solenoid 76 the cam is lifted off its drive 116 as a consequence of the resulting outward movement of the solenoid armature, which is loaded by a spring, not shown. The stop assembly for the cam (corresponding to stop 78 in the wiring diagram) is indicated at 144, and it will be noted that the same is adjustable in the slot 145.

Figure 8:
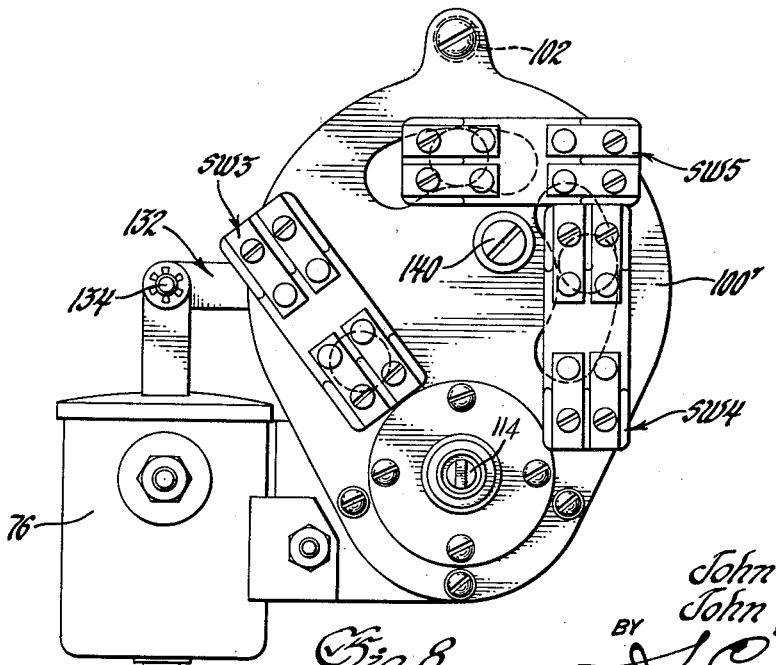

For the purpose of the previously described switching, the righthand face of the cam is contoured by the addition of sectors 150 engaged by the plungers 152 of the switches, the placement of which will be seen from FIGURE 8. These switches, like the stop assembly, are adjustable in arcuate slots.

The cam assembly per se is not a part of the present invention, being claimed in co-pending application Serial No. 568,010, filed February 27, 1956, such application being owned by the assignee herein and since issued at Patent No. 3,029,884.

What is claimed is:

1. Apparatus adapted for application to a motor vehicle for the purpose described, said apparatus comprising a steering shaft member having a gear fixed thereto, a reversible electric motor having an output gear, a third gear independently supported and in mesh with said output gear, said third gear having a fourth gear fixed thereto normally out of engagement with said first gear, solenoid means for bringing about engagement of said fourth and first gears, a grooved plate carried by said first gear, a pivotally supported member carrying a stylus riding on said plate, cam control means operated in accordance with the amount of rotation of the road wheels of the vehicle, said cam control means being electrically connected to said motor and said solenoid means, and switch means in the circuit between said cam control means and said motor arranged to be opened by said stylus-carrying member on movement thereof induced by the groove of said grooved plate.

2. In association with an automotive vehicle having a steering mechanism and road wheels, apparatus for accomplishing automatically a pre-set maneuver of such vehicle, said apparatus comprising control means operated in correspondence with the amount of rotation of said road wheels, electrically energized power means governed by said control means and serving to power said steering mechanism as required for the maneuver, a gear train operably connecting said power means to said steering mechanism, normally closed switch means in circuit with said motor, cam means carried by a component of said gear train, a pivoted arm having a follower complementary to said cam means and adapted to open said switches to de-energize said power means, regardless of the action of said control means, following a predetermined degree of powered movement of said steering mechanism.

3. In association with an automotive vehicle having a steering mechanism and road-engaging traction means, apparatus for accomplishing automatically a pre-set maneuver of such vehicle, said apparatus comprising control means carried in its entirety by the vehicle and operated in accordance with the amount of movement of said road-engaging traction means, said control means being self-contained and independent in its normal operation of any influence extraneous of the vehicle, electrically energized power means governed by said control means and serving to power said steering mechanism as required for the maneuver, normally closed switch means in circuit with said electrically energized power means, and means actuated by said power means serving to open said switch means to de-energize said power means regardless of the action of said control means, following a predetermined degree of powered movement of said steering mechanism.

4. In association with an automotive vehicle having a steering mechanism and road wheels, apparatus for accomplishing automatically a preset maneuver of such vehicle, said apparatus comprising control means carried in its entirety by the vehicle and operated in accordance with the amount of rotation of said road wheels, said control means being self-contained and independent in its normal operation of any influence extraneous of the vehicle, electric motor means governed by said control means and serving to power said steering mechanism as required for the maneuver, normally closed switch means in circuit with said electric motor means, and means actuated by said electric motor means serving to open said switch means to de-energize said electric motor means regardless of the action of said control means, following a predetermined degree of powered movement of said steering mechanism.

5. Apparatus according to claim 4 where said electric motor means is a reversible electric motor.

6. In an automotive vehicle having a steering mechanism and road wheels, apparatus for accomplishing automatically a preset maneuver of such vehicle, said apparatus comprising cam control means carried in its entirety by the vehicle and rotated in accordance with the amount of rotation of said road wheels, said control means being self-contained and independent in its normal operation of any influence extraneous of the vehicle, a reversible electric motor operably connected to said steering mechanism to power the same as required for the maneuver, operating switches in circuit with said motor and associated with said cam control means for actuation thereby, normally closed auxiliary switches in circuit with said motor and means actuated by said motor to open said auxiliary switches to de-energize said motor regardless of the action of said cam control means, following a predetermined degree of powered movement of said steering mechanism.

7. In association with an automotive vehicle having a steering mechanism and speedometer drive shaft, apparatus for accomplishing automatically a pre-set maneuver of such vehicle, said apparatus comprising cam control means carried in its entirety by the vehicle and operated by said drive shaft, said control means being self-contained and independent in its normal operation of any influence extraneous of the vehicle, a reversible electric motor operably connected to said steering mechanism to power the same as required for the maneuver, operating switches in circuit with said reversible electric motor and associated with said cam control means for actuation thereby, normally closed auxiliary switches in said circuit between said first switches and said motor, and means actuated by said motor to open said auxiliary switches to de-energize said motor regardless of the action of said cam control means, following a predetermined degree of powered movement of said steering mechanism.

References Cited in the file of this patent
UNITED STATES PATENTS

| | | |
|---|---|---|
| 1,144,552 | Lardner et al. | June 29, 1915 |
| 1,570,547 | Avera | Jan. 19, 1926 |
| 2,551,742 | Huebner et al. | May 8, 1951 |
| 2,736,015 | Gilvarry et al. | Feb. 21, 1956 |
| 2,775,132 | Orr et al. | Dec. 25, 1956 |